United States Patent [19]

Takizawa

[11] Patent Number: 4,957,308
[45] Date of Patent: Sep. 18, 1990

[54] REAR SUSPENSION APPARATUS FOR MOTOR VEHICLES

[75] Inventor: Shozo Takizawa, Okazaki, Japan

[73] Assignee: Mitsubishi Jidosha Kogyo Kabushiki Kaisha, Tokyo, Japan

[21] Appl. No.: 384,493

[22] Filed: Jul. 24, 1989

[30] Foreign Application Priority Data

Jul. 29, 1988 [JP] Japan ................. 63-190124
Jul. 29, 1988 [JP] Japan ................. 63-190125
Jul. 29, 1988 [JP] Japan ................. 63-190126
Jul. 29, 1988 [JP] Japan ................. 63-190127

[51] Int. Cl.$^5$ .............................................. B60G 3/00
[52] U.S. Cl. .................................. 280/666; 280/675;
                                                280/701; 280/670
[58] Field of Search ............... 280/666, 670, 673, 675,
                                                280/701, 696

[56] References Cited

U.S. PATENT DOCUMENTS

| 3,827,711 | 8/1974 | Muller | 280/666 |
| 3,881,741 | 5/1975 | Muller | 280/675 |
| 4,440,419 | 4/1984 | Kosak et al. | 280/675 |
| 4,444,415 | 4/1984 | von der Ohe | 280/701 |
| 4,591,184 | 5/1986 | Matschinsky | 280/666 |

FOREIGN PATENT DOCUMENTS 876280 8/1961 United Kingdom .
2198398 A 6/1988 United Kingdom .

Primary Examiner—Kenneth R. Rice
Attorney, Agent, or Firm—Frishauf, Holtz, Goodman & Woodward

[57] ABSTRACT

A rear suspension apparatus for use in a motor vehicle comprises a wheel carrier rotatably supporting a rear wheel of the vehicle, an upper arm connecting the upper portion of the wheel carrier and the vehicle body, an A-shaped lower arm connecting the wheel carier and the vehicle body, and a swing arm extending from the wheel carrier inwardly of the vehicle body and obliquely at a predetermined angle to the longitudinal direction of the vehicle body. The swing arm has two outer ends set apart from each other in the longitudinal direction of the vehicle body and pivotably connected to the vertically central portion of the wheel carrier, and an inner end pivotably connected to the vehicle body.

14 Claims, 8 Drawing Sheets

REAR SUSPENSION APPARATUS FOR MOTOR VEHICLES

BACKGROUND OF THE INVENTION

This invention relates to a rear suspension apparatus for use in a motor vehicle, and more particularly, to an independent rear suspension apparatus.

Figure 10:
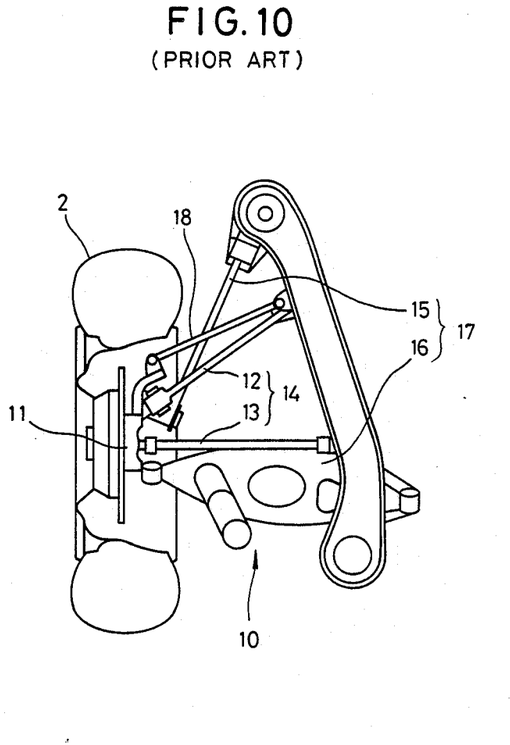
FIG. 10 is a plan view of a prior art rear suspension apparatus.
Figure 11:
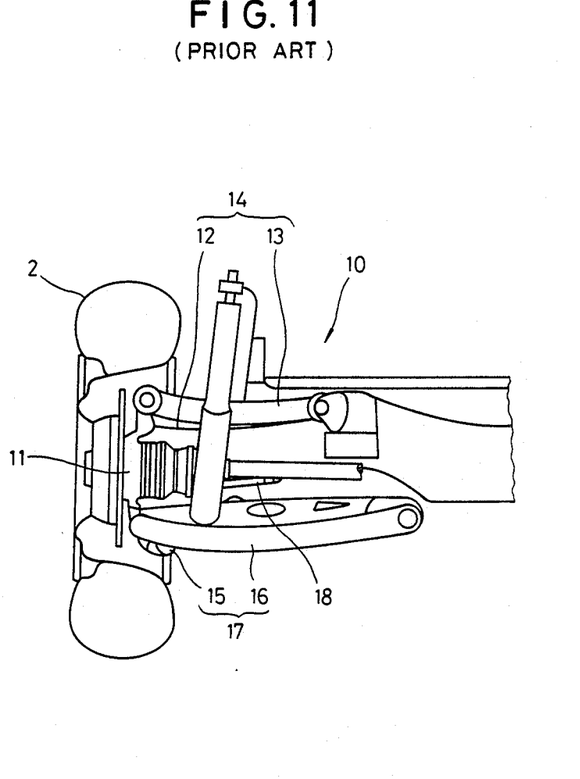
FIG. 11 is a side view of the apparatus shown in FIG. 10 as viewed from the rear of the vehicle.

With a recent tendency to equip motor vehicles with high-output engines, high-performance tires have come to be used for vehicles, and also there are various requirements for suspension apparatuses connecting tires, i.e., wheels, to a vehicle body, to improve the drivability and running stability of the vehicles so that driving the vehicle is comfortable. One of these requirements is to ensure sufficient freedom of design in setting the characteristics of changes of the wheel alignment including the toe angle change characteristic and the camber angle change characteristic of the wheels, etc. An example of a suspension apparatus meeting this requirement is a so-called multilink suspension apparatus, which is disclosed, e.g., in U.S. Pat. No. 4,444,415 (patent family members: British Patent No. 2091175; German Patent No. 3048794). According to this patent, a rear suspension apparatus 10 comprises, as shown in FIGS. 10 and 11, a wheel carrier 11 rotatably supporting a rear wheel 2, an upper arm assembly 14 connecting the wheel carrier 11 and a vehicle body and including an upper front arm 12 and an upper rear arm 13, a lower arm assembly 17 connecting the wheel carrier 11 and the vehicle body and including a lower front arm 15 and a lower rear arm 16, and a toe control arm 18 for regulating the toe angle of the rear wheel 2.

In this rear suspension apparatus 10, a desired toe angle and a desired camber angle can be obtained by suitably setting the individual lengths and relative vertical mounting positions of the arms 12, 13, 15, 16 and 18 of the arm assemblies 14 and 17, as well as the orientation of these arms, i.e., the mounting angles with respect to the axis of the vehicle body. Further, when the suspension apparatus 10 moves vertically together with the rear wheel 2, the arms 12, 13, 15, 16 and 18 are swung while interfering with each other, whereby the toe angle and the camber angle are respectively changed.

However, the prior art suspension apparatus 10 requires five arms 12, 13, 15, 16 and 18 arranged between the wheel carrier 11 and the vehicle body, and thus is complicated in structure and allows for little space between the arms, making the mounting of the arms very difficult. To permit an easy mounting of the arms, sufficient space may be provided between the arms, but this results in an undesirable increase in the overall size of the suspension apparatus 10. An increased size of the suspension apparatus 10 not only imposes restrictions on the dimensions of the passenger's compartment, trunk room, fuel tank, etc. of the vehicle but also narrows the freedom of arrangement of the exhaust pipe extending from the engine, and the fuel pipe connecting the fuel tank and the engine, and hence the manufacturing cost of vehicles increases.

Moreover, the toe angle change characteristic and the camber angle change characteristic of the rear suspension apparatus 10 are determined by the so-called link interference occurring when the arms 12, 13, 15, 16 and 18 swing as mentioned above, and accordingly are in an interdependent relationship. Thus, it is not possible to suitably set these change characteristics independent of each other.

OBJECTS AND SUMMARY OF THE INVENTION

The object of this invention is to provide a rear suspension apparatus for motor vehicles which can eliminate the above-mentioned disadvantages of the prior art suspension apparatus, by ensuring sufficient freedom of design for setting wheel alignment change characteristics, such as toe angle change characteristic, a camber angle change characteristic, etc., and which is simplified in structure and small in size.

The above object is achieved by a rear suspension apparatus for motor vehicles according to this invention, which comprises a wheel carrier rotatably supporting the rear wheel and having an upper portion and a lower portion, an upper arm extending inward from the wheel carrier in a widthwise direction of the vehicle body and having an outer end pivotably connected to the upper portion of the wheel carrier and an inner end pivotably connected to the vehicle body, a lower arm assembly extending inwardly of the vehicle body from the wheel carrier and having a plurality of inner ends pivotably connected to the vehicle body and at least one outer end pivotably connected to the lower portion of the wheel carrier and cooperating with the outer end of the upper arm to define a center line of a virtual kingpin, and a swing arm extending from the wheel carrier inwardly of the vehicle body and obliquely at a predetermined angle to a longitudinal direction of the vehicle body, the swing arm having two outer ends located between the outer end of the upper arm and the outer end of the lower arm assembly and pivotably connected to the wheel carrier, the outer ends of the swing arm being spaced from each other in the longitudinal direction of the vehicle body, and an inner end pivotably connected to the vehicle body.

According to the invention, the wheel carrier is coupled to the vehicle body by the upper arm, the lower arm assembly and the swing arm, and the upper arm and the swing arm, which should be arranged close to each other, are coupled to the vehicle body by two pivots in total, whereby sufficient space is provided for the mounting of the upper arm and the swing arm to the vehicle body. Further, the overall size of the rear suspension apparatus can be reduced.

The swing arm has two outer ends pivotably connected to the wheel carrier and set apart from each other in the longitudinal direction of the vehicle body. Therefore, when the rear suspension apparatus makes a vertical stroke motion, the wheel carrier is rotated by the swing arm about the center line of the virtual kingpin defined by the outer ends of the upper arm and the lower arm assembly. Thus, the toe angle change characteristic in relation to the stroke motion of the rear suspension apparatus is chiefly determined by the swing arm. The upper arm and arms or arm portions constituting the lower arm assembly have the respective lengths, mounting positions and mounting angles set suitably, so that, when the rear suspension apparatus makes a stroke motion, the wheel carrier can be inclined inwardly of the vehicle body. Thus, the camber angle change characteristic is chiefly determined by the upper arm and the lower arm assembly.

As described above, according to the invention, the toe angle change characteristic is determined by the swing arm, and the camber angle change characteristic is determined by the upper arm and the lower arm assembly. Thus, these characteristics can be independently set as needed.

The center of instantaneous rotation in the pitching and rolling directions of the vehicle body is also hypothetically determined and thus can be set at any desired position.

Moreover, since the number of arms included in the rear suspension apparatus is substantially reduced, it is possible to provide a small-sized rear suspension apparatus of a simplified structure. Hence, not only the space for the passenger's compartment, trunk room and fuel tank of the vehicle can be increased, but the manufacturing cost can be reduced.

According to a preferred example, the inner end of the swing arm, which is pivotably connected to the vehicle body, is located frontward of the vehicle body relative to the two outer ends of the same pivotably connected to the wheel carrier, in other words, the swing arm acts as a trailing arm, and this trailing arm is located at a position lower than the upper arm and upper than the axle of the rear wheel. In this case, the center of instantaneous rotation of the vehicle as viewed in the longitudinal direction of the vehicle body is hypothetically determined by the pivots on which the upper arm, trailing arm and lower arm assembly swing with respect to the vehicle body, respectively. Therefore, the center of instantaneous rotation can be relatively easily set at a desired position, and accordingly, a force that effectively restrains the pitching motion of the vehicle body can be produced in the rear suspension apparatus.

Still preferably, means for pivotably connecting the outer ends of the swing arm to the wheel carrier includes elastic bushings, and the axis of the elastic bushings, i.e., the axis on which the swing arm swings with respect to the wheel carrier, extends in the longitudinal direction of the vehicle body. In this case, the elastic bushing can efficiently absorb vibrations of the wheel carrier, which otherwise will be transmitted to the vehicle body, while maintaining the rigidity of the rear suspension apparatus to be enough to endure changes of the toe angle, whereby the driving comfortableness of the vehicle can be improved.

According to still another preferable example, the inner end of the swing arm, which is pivotably connected to the vehicle body, is located frontward of the vehicle body relative to the two outer ends of the same pivotably connected to the wheel carrier, in other words, the swing arm acts as a trailing arm, and means for pivotably connecting the inner end of this trailing arm to the vehicle body includes an elastic bushing. The axis of the elastic bushing, i.e., the axis on which the trailing arm swings with respect to the vehicle body, is inclined at a predetermined angle to a line perpendicular to a line passing the centers of the rear wheel and elastic bushing, as viewed in plane from above the vehicle body. In this case, the toe angle can be changed by the force acting on the rear wheel in the longitudinal direction of the vehicle body, i.e., the driving force or braking force, and therefore, the the toe angle change characteristic in relation to the stroke motion of the rear suspension apparatus, mentioned above, can be set independent of the toe angle change characteristic in relation to the longitudinal force acting on the rear wheel, by the swing arm, respectively. Accordingly, the freedom of setting the toe angle change characteristic is broadened, and thus the running performance of the vehicle can be improved.

The above and other objects, features, and advantages of the present invention will become more apparent from the ensuing detailed description taken in connection with the accompanying drawings.

DETAILED DESCRIPTION

Figure 1:
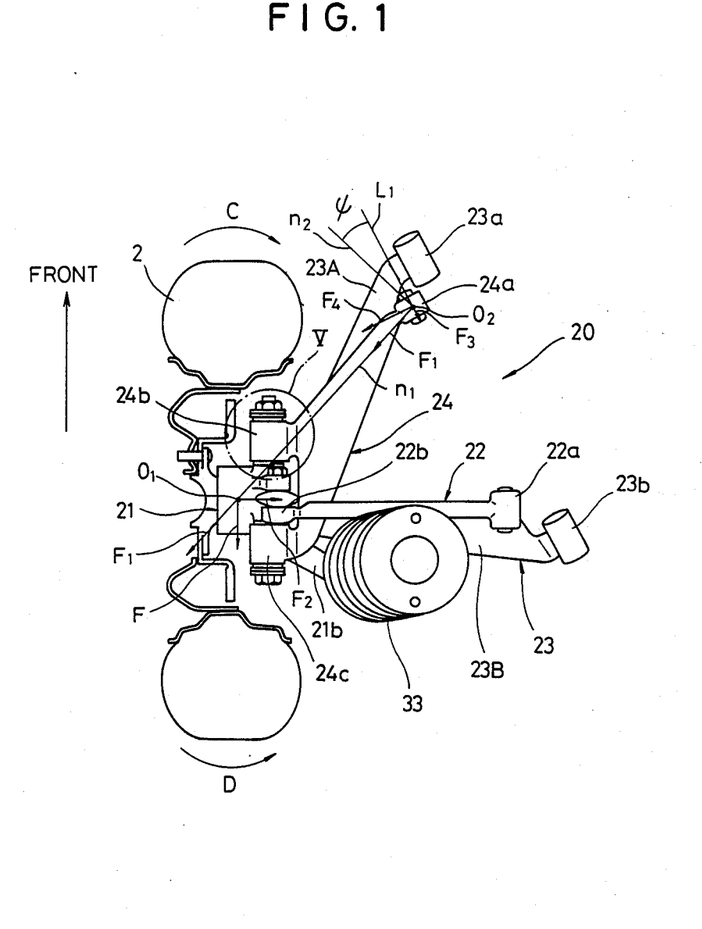
FIG. 1 is a plan view of a rear suspension apparatus according to one embodiment of the invention.
Figure 2:
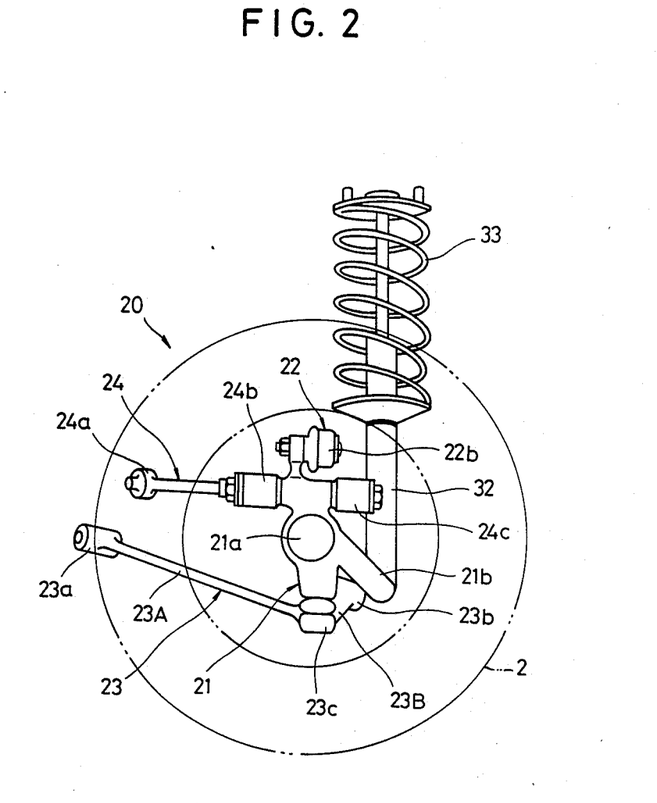
FIG. 2 is a side view of the apparatus shown in FIG. 1.

Referring to FIGS. 1 and 2, a rear suspension apparatus 20 comprises a wheel carrier 21, an upper arm 22, a lower arm 23, and a trailing arm 24. The wheel carrier 21 has an axle housing 21a for rotatably supporting a rear wheel 2.

The upper arm 22 is an I-shaped arm extending horizontally from the side of the wheel carrier 21 in the widthwise direction of a vehicle body, not shown. One end of the upper arm 22 remote from the wheel carrier 21 is formed as a connection end 22a for the vehicle body, and a mounting hole is bored through the connection end 22a in a direction perpendicular to the longitudinal direction of the upper arm 22. The connection end 22a of the upper arm 22 is pivotably coupled to a predetermined position of the vehicle body by a connection pin and an elastic bushing fitted in the mounting hole. The other end of the upper arm 22 is formed as a connection end 22b for the wheel carrier 21, which connection end 22b is pivotably coupled to an upper portion of the wheel carrier 21 by a ball joint. The axis of the mounting hole at the connection end 22a of the upper arm 22 extends along the longitudinal axis of the vehicle body. Accordingly, when the wheel carrier 21 moves vertically together with the rear wheel 2 relative to the vehicle body, the upper arm 22 swings about the axis of the mounting hole at the connection end 22a. As the upper arm 22 swings in this manner, its connection end 22b is, along with the wheel carrier 21, displaced in the vertical direction as well as in the widthwise direction of the vehicle body.

The lower arm 23 includes a pair of arms defining and A form, i.e., a front arm 23A and a rear arm 23B with respect to the running direction of the vehicle body. The front arm 23A and the rear arm 23B are integrally coupled to each other at one end, and the coupled portion of the arms 23A and 23B is formed as a connection end 23c for the wheel carrier 21. The front arm 23A extends from the side of the wheel carrier 21 in the frontward direction of the vehicle body indicated by the arrow in FIG. 1, but obliquely toward the longitudinal axis of the vehicle body and at the same time upward, as seen from FIG. 2. The rear arm 23B extends substantially horizontally from the side of the wheel carrier 21 in the widthwise direction of the vehicle body over the upper arm 22 toward the longitudinal axis of the vehicle body, so that the rear arm 23B is closer to the vehicle longitudinal axis than the front arm 23A. The other ends of the front and rear arms 23A and 23B are formed as connection ends 23a and 23b for the vehicle body, respectively, like the connection end 22a of the upper arm 22. Thus, the connection ends 23a and 23b of the lower arm 23 are pivotably coupled to respective predetermined positions of the vehicle body through a connection pin and an elastic bushing. The remaining connection end 23c of the lower arm 23 is pivotably coupled to a lower portion of the wheel carrier 21 by a ball joint.

As will be clear from the above description, the connection end 23a of the front arm 23A is located at a position upper than and closer to the rear wheel 2 than the connection end 23b of the rear arm 23B. The axes of the mounting holes of the connection ends 23a and 23b extend along a line inclined to the longitudinal axis of the vehicle body. Accordingly, when the wheel carrier 21 moves vertically with the rear wheel 2 relative to the vehicle body, the lower arm 23 swings about the axes of the mounting holes at the connection ends 23a and 23b. As the lower arm 23 swings in this manner, the connection end 23c is displaced in the vertical direction and in the widthwise direction relative to the vehicle body, and is also displaced in the longitudinal direction of the vehicle body because the mounting holes of the connection ends 23a and 23b are directed along the line inclined to the longitudinal axis of the vehicle body. Since the lower arm 23 is longer than the upper arm 22, the amount of displacement of the connection end 23c of the lower arm 23 in the vertical and widthwise directions relative to the vehicle body is smaller than that of the upper arm 22, mentioned above, in the corresponding directions.

Figure 3:
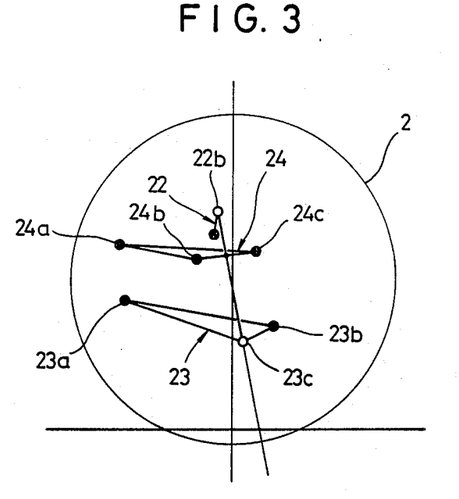
FIG. 3 is a diagram showing a simplified illustration of the apparatus shown in FIG. 2.

As shown in FIGS. 2 and 3, the mounting position at which the connection end 22b of the upper arm 22 is mounted to the wheel carrier 21 is located on the front side of the vehicle body relative to the mounting position at which the connection end 23c of the lower arm 23 is mounted to the wheel carrier 21. The center line of a virtual kingpin of the suspension apparatus 20 is determined by a line passing the center of the ball joint of the connection end 22b of the upper arm 22 and the center of the ball joint of the connection end 23c of the lower arm 23. Since the connection end 22b is located on the front side of the vehicle body relative to the connection end 23c, in other words, the top of the virtual kingpin is inclined toward the frontward direction of the vehicle, the caster angle of the rear wheel 2 is always negative and thus the caster trail is negative. The absolute value of the caster trail is set to be always larger than that of the pneumatic trail.

The above-mentioned trailing arm 24 is formed by casting or forging, and has an inverted-A form as compared to the lower arm 23. Specifically, the trailing arm 24 has two ends thereof (at the side of the wheel carrier 21) bifurcated in the longitudinal direction of the vehicle body, and extends substantially horizontally above the front arm 23A of the lower arm 23 toward the front and the longitudinal axis of the vehicle body. Thus, the trailing arm 24 forms a triangle, the vertex of which corresponds to the remaining end remote from the wheel carrier 21, and the base of which corresponds to a line between the bifurcated ends near the wheel carrier 21, with the other two sides having different lengths. Namely, the trailing arm 24 has a connection end 24a defining the above vertex and connection ends 24b and 24c defining the opposite ends of the base, and the distance between the connection ends 24a and 24b is shorter than that between the connection ends 24a and 24c.

Figure 4:
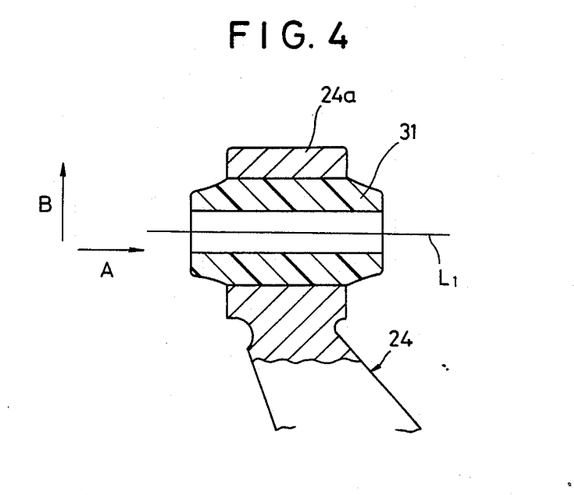
FIG. 4 is an enlarged sectional view of an end of a trailing arm in the apparatus shown in FIG. 1.
Figure 5:
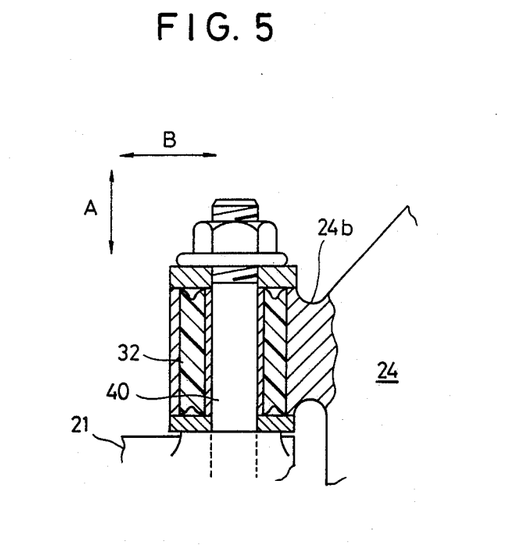
FIG. 5 is an enlarged sectional view of a part indicated by V in FIG. 1.

At the connection end 24a of the trailing arm 24 is formed a mounting hole shown in FIG. 4, in which an elastic bushing 31 is fitted, like the connection ends 22a, 23a, and 23b. This connection end 24a is, therefore, pivotably coupled to a predetermined mounting position of the vehicle body by a connection pin (not shown in FIG. 4) and the elastic bushing 31. On the other hand, the bifurcated connection ends 24b and 24c of the trailing arm 24 each have a mounting hole bored therethrough, such that the axes of the mounting holes are aligned with each other and parallel to the longitudinal axis of the vehicle body. An elastic bushing 32, similar to the aforesaid one 31, is fitted in each of the mounting holes of the connection ends 24a and 24b, as shown in FIG. 5. FIG. 5 shows only one (24b) of the connection ends 24b and 24c. The connection ends 24b and 24c of the trailing arm 24 are pivotably coupled to the wheel carrier 21, respectively by a connection pin 40 and the elastic bushing 32. The mounting positions at which the connection ends 24b and 24c are respectively mounted to the wheel carrier 21 are lower than the mounting position of the connection end 22b of the upper arm 22 and upper than the axis of the rear wheel 2, as shown in FIG. 2.

The elastic bushings 31 and 32 are each made of a cylindrical rubber, for example, and have such a property that elastic deformation is liable to occur in the direction indicated by arrow A in FIGS. 4 and 5 but it hardly occurs in the direction indicated by arrow B. A load on the trailing arm 24 transmitted from the wheel carrier 21 is applied dispersedly on the connection ends 24b and 24c. Accordingly, the dispersed load which the elastic bushings 32 of the connection ends 24b and 24c receive is small, and thus a rubber bushing which is relatively soft and has an excellent vibration absorbing capability can be used for the elastic bushings 32. Of course, the elastic bushings 32 have similar elasticity.

The mounting hole of the connection end 24a of the trailing arm 24 has an axis thereof directed parallel to the axis of the mounting hole at the connection end 23a of the lower arm 23 and inclined at a predetermined angle to the longitudinal direction of the vehicle body. More specifically, as shown in FIG. 1, the axis L1 of the mounting hole of the connection end 24a is inclined at a crossing angle $\psi$ with respect to line n2 perpendicular to line n1 passing the center O1 of the rear wheel 2 and the axial center O2 of the elastic bushing 31, when viewed in plane from above the vehicle body.

In FIG. 2 is shown a damper 32, around the upper half of which a coil spring 33 is arranged. The lower end of the damper 32 is pivotably connected to a free end of an arm 21b integrally extending from the central portion of the wheel carrier 21 downward in a direction approaching the longitudinal axis of the vehicle body. The upper end of the damper 32 is pivotably connected to the vehicle body.

In the rear suspension apparatus 20 described above, the center of instantaneous rotation as viewed from the side of the vehicle body is hypothetically determined as follows.

Figure 6:
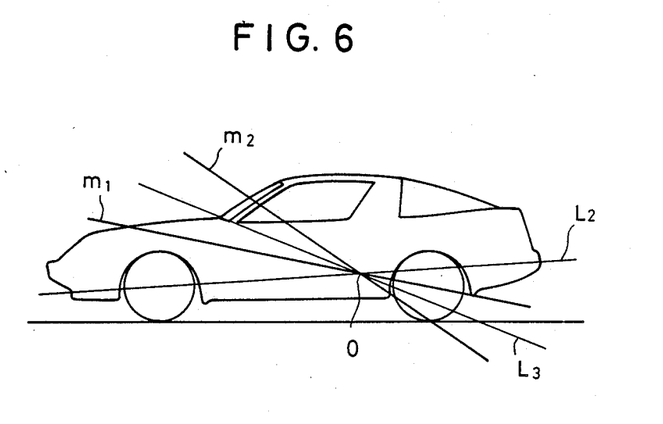
FIG. 6 is a side view of a motor vehicle, illustrating a center of instantaneous rotation of the apparatus of FIG. 1 as viewed from the side of the vehicle.

Referring to FIG. 6, the virtual center of instantaneous rotation in the longitudinal direction of the vehicle body will be described in detail. In FIG. 6 showing a side of a vehicle, line L2 is parallel to a line passing the connection end 22a of the upper arm 22 and the connection end 24a of the trailing arm 24 and passes the connection end 22b of the upper arm 22, and line L3 is parallel to a line passing the connection ends 23a and 23b of the lower arm 23 and passes the connection end 23c of the lower arm 23. Thus, the intersecting point of the lines L2 and L3 is the virtual center of instantaneous rotation in the longitudinal direction of the vehicle body.

In FIG. 6, line m1 is parallel to a line passing the point in a vertical plane including the axle of the front wheel, which point corresponds in height to the gravitational center of the vehicle, and a contact point between the rear wheel 2 and the ground, and passes the axle of the rear wheel (as viewed from the side of the vehicle body). If the virtual center O of instantaneous rotation is located on the line m1, the rear suspension apparatus 20 can produce a force inhibiting a squat of the vehicle body at acceleration of the vehicle.

Line m2 in FIG. 6 passes the point which is in a vertical plane dividing the wheel base of the vehicle in the ratio of the front and rear braking forces and corresponds in height to the gravitational center of the vehicle (braking center), and also passes the contact point between the rear wheel 2 and the ground (viewed from the side of the vehicle body). If the virtual center O of instantaneous rotation is located on the line m2, the rear suspension apparatus 20 can produce a force inhibiting a tail lift of the vehicle body at deceleration of the vehicle.

Therefore, in the rear suspension apparatus 20 of the invention, the upper arm 22, the lower arm 23 and the trailing arm 24 are suitably arranged so that the above-mentioned virtual center O of instantaneous rotation is located at the intersecting point of the lines m1 and m2.

The function of the above rear suspension apparatus 20 will now be described.

The wheel carrier 21 of the rear suspension apparatus 20 is coupled to the vehicle body only by the three arms 22, 23 and 24. Thus, the number of arms connecting the wheel carrier 21 to the vehicle body is reduced, as compared to the prior art rear suspension apparatus 10 shown in FIGS. 10 and 11.

When the wheel carrier 21 moves vertically with the rear wheel 2 relative to the vehicle body, that is, when the suspension apparatus 20 makes a stroke motion, the upper arm 22 and the lower arm 23 are swung about their respective connection ends which are pivotably connected to the vehicle body. In this case, the amount of displacement that the connection end 22b of the upper arm 22 is drawn inward of the vehicle body is greater than the amount of displacement that the connection end 22c of the lower arm 23 is drawn inward of the vehicle, as mentioned above, and therefore, the wheel carrier 21 is inclined with the upper portion thereof tilted inward of the vehicle body and thus the camber angle of the rear wheel 2 changes. The camber angle change characteristic is therefore determined chiefly by the upper arm 22 and the lower arm 23.

Next, vertical movement of the wheel carrier 21 relative to the vehicle body will be described, referring to the trailing arm 24 in which the distance between the connection ends 24a and 24b is shorter than that between the connection ends 24a and 24c, as mentioned above. When the wheel carrier 21 moves upward relative to the vehicle body, that is, when the suspension apparatus 20 bumps, the trailing arm 24 is, due to the above-mentioned difference of distance, displaced such that the connection end 24b is drawn more inwardly of the vehicle body than the connection end 24c. Accordingly, the wheel carrier 21 is swung about the center line of the aforementioned virtual kingpin in the direction of arrow C in FIG. 1, thus turning the rear wheel 2 in the toe-in direction. On the other hand, when the wheel carrier 21 moves downward relative to the vehicle body, that is, when the suspension apparatus 20 rebounds, the trailing arm 24 is swung reversely such that the connection end 23c is drawn more inwardly of the vehicle body than the connection end 24b. As a result, the wheel carrier 21 is swung about the center line of the virtual kingpin in the direction of arrow D in FIG. 1, and thus the rear wheel 2 is turned in the toe-out direction.

As will be clear from above, when the suspension apparatus 20 makes a stroke motion, the toe angle change characteristic of the rear wheel 2 is determined by the trailing arm 24, i.e., the difference between the distance from the connection end 24a to 24b and the distance from the connection end 24a to 24c, namely, the positional relationship between the connection end 24a and the connection ends 24b and 24c. Thus, since the toe angle change characteristic of the rear wheel 2 is determined chiefly by the trailing arm 24, the suspension apparatus 20 of this invention does not require a toe control arm, such as the one 18 used in the prior art suspension apparatus 10 of FIGS. 10 and 11 for controlling the toe angle.

According to the rear suspension apparatus 20 of this invention, the camber angle change characteristic can be determined separately from the toe angle change characteristic, whereby these characteristics can be set independently to respective desired settings. Further, the setting of the above characteristics can be carried out relatively freely by merely adjusting the individual lengths, mounting positions and mounting angles of the arms 22, 23 and 24.

When the rear wheel 2 is braked, backward force F acts upon the center O1 of the rear wheel 2 in the wheel carrier 21, as shown in FIG. 1. This force F can be divided into a component F1 along the abovementioned line n1 and a component F2 along the widthwise direction of the vehicle body. The component F1 of the force F acts on the axial center O2 of the elastic bushing 31 along the line n1, and accordingly creates a moment acting on the rear wheel 2 to rotate it about the center line of the virtual kingpin. Namely, the line n1 is not at right angles to the axis L1 of the elastic bushing 31 of the connection end 24a, as is clear from the foregoing description, and thus the component F1 can further be divided into a component F3 directed toward the rear side of the vehicle body along the axis L1, and a force F4 perpendicular to the axis L1. The elastic bushing 31 has such a property that elastic deformation is liable to occur in the direction along the axis L1 but it hardly occurs in the direction perpendicular to the axis L1, and accordingly, even if the component F3 is smaller than the component F4, the elastic bushing 31 undergoes a large elastic shear deformation in the direction along the axis L1 toward the rear side of the vehicle body. In accordance with the shear deformation of the elastic bushing 31, the connection end 24a of the trailing arm 24 is displaced along the axis L1 toward the rear side of the vehicle body. As a result, the connection end 24b of the trailing arm 24 is drawn inward of the vehicle body, and the wheel carrier 21 is swung in the direction of arrow C in FIG. 1, thus turning the rear wheel 2 in the toe-in direction.

When the rear wheel 2 is accelerated, a force reverse to the force F acts upon the center O1 of the rear wheel 2. Therefore, the trailing arm 24 moves reversely to the above-described case, and the wheel carrier 21 is swung in the direction of arrow D in FIG. 1, whereby the rear wheel 2 is turned in the toe-out direction.

Thus, at the time of acceleration and deceleration of the vehicle, the toe angle of the rear wheel 2 is changed also by the forces acting in the longitudinal directions of the rear wheel 2. In this case, the toe angle change characteristic can be set by the amount of deformation of the elastic bushing 31, i.e., the elasticity of the bushing 31, and the displacement of the connection end 24a of the trailing arm 24 along the direction of the axis L1.

As will be evident from above, the toe angle change characteristic in relation to the stroke motions of the suspension apparatus 20 can be set independent of the toe angle change characteristic in relation to the braking and driving forces acting on the wheel 2 in the longitudinal directions of the vehicle body.

Moreover, the trailing arm 24 has a large rigidity against deformation, and therefore, undesirable changes of the toe angle can be prevented by the rigidity of the trailing arm 24.

Since the connection ends 24b and 24c of the trailing arm 24 are coupled to the wheel carrier 21 through the elastic bushings 32, vibrations as caused when the rear wheel 2 runs over a projection, such as a pebble stone, can be absorbed by the two elastic bushings 32, whereby transmission of such vibrations to the vehicle body through the trailing arm 24 can be reduced.

When the rear wheel 2 bumps, the connection end 23c of the lower arm 23 is displaced frontward of the vehicle body. Therefore, as the bump amount of the rear wheel 2 increases, the caster angle approaches 0 and thus the absolute value of the caster trail decreases. In this case, the pneumatic trail decreases with an increase in the cornering force acting on the rear wheel 2, i.e., the bump amount of the rear wheel 2. Thus, a difference between the caster trail and the pneumatic trail, i.e., the trail offset, is maintained substantially constant. As a result, the moment acting on the rear wheel 2 to rotate the same about the center axis of the virtual kingpin, which can be expressed as the product of the cornering force and the trail offset, increases or decreases with an increase or decrease of the bump amount of the rear wheel 2, whereby the toe angle change characteristic at cornering of the vehicle can be maintained to be substantially constant.

The center O of instantaneous rotation of the suspension apparatus 20 in the longitudinal direction of the vehicle body is hypothetically determined by the lengths, mounting positions and mounting angles of the arms 22, 23 and 24, and thus the freedom of positioning the center O of instantaneous rotation is broadened. Therefore, if the center O of instantaneous rotation of the suspension apparatus 20 is suitably set, the suspension apparatus 20 can produce an anti-squat force and an anti-tail lift force to restrain the pitching motion of the vehicle body, and also can set a transient slip angle defined in accordance with the height of the roll center during turning of the vehicle, i.e., the cornering force.

The upper arm 22 and the rear arm 23B of the lower arm 23 extend in the widthwise direction of the vehicle body, and the trailing arm 24 and the front arm 23A of the lower arm 23 extend frontward of the vehicle body but obliquely. Therefore, the camber moment is borne by the upper arm 22 and the rear arm 23B, and the longitudinal force is borne by the trailing arm 24 and the front arm 23A, whereas the moment about the center line of the virtual kingpin is borne by the trailing arm 24. Thus, various forces are efficiently endured as shared by the arms 22, 23A, 23B and 24, whereby the rigidity of the suspension 20 can be improved.

Figure 7:
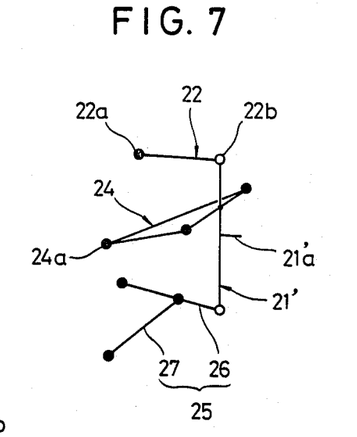
FIGS. 7 to 9 are diagrams showing simplified illustrations of apparatuses according to other embodiments of the invention.
Figure 12:
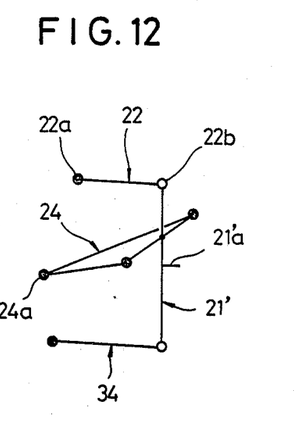
FIG. 12 is a skeletal diagram showing an arrangement of a suspension apparatus for the sake of explanation of the invention.

In the foregoing embodiment, an A-shaped arm is used for the lower arm 23, but the form of the lower arm is not limited to this alone. The upper arm 22 is I-shaped, and therefore, if the lower arm 34 is formed as an I-shaped lateral arm as shown in FIG. 12, then the suspension apparatus will not function properly. In this case, the lower arm assembly connecting the wheel carrier 21 and the vehicle body may be designed to have a plurality of connection ends for the vehicle body. For example, a lower arm assembly 25 shown in FIG. 7 includes an I-shaped lateral arm 26 connecting a wheel carrier 21' and the vehicle body, and a tension rod 27 connecting the lateral arm 26 and the vehicle body.

Figure 8:
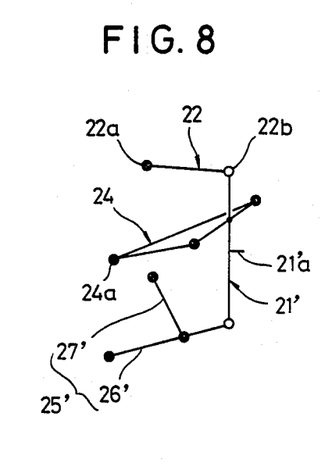

A lower arm assembly 25' shown in FIG. 8 includes an I-shaped lateral arm 26' connecting the wheel carrier 21' and the vehicle body, and a compression arm 27' connecting the lateral arm 26' and the vehicle body.

Figure 9:
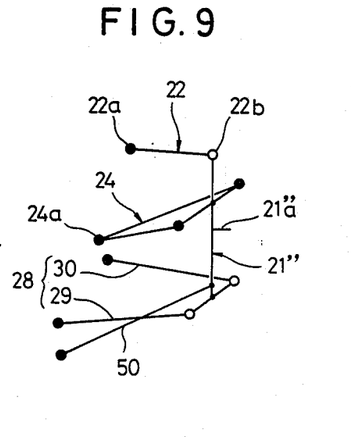

A lower arm assembly 28 shown in FIG. 9 comprises a multi-link system including a front lateral arm connected at one end to the front of a lower portion of a wheel carrier 21" and connected at the other end to the vehicle body, and a rear lateral arm 30 connected at one end to the rear of the lower portion of the wheel carrier 21" and connected at the other end to the vehicle body.

In the above-described embodiment, the elastic bushings 32 of the connection ends 24b and 24c of the trailing arm 24 have the same elasticity; but they may have different elasticities, in which case, the toe angle can be controlled in accordance with external forces.

Moreover, the damper 32 of the above-described embodiment has its upper half surrounded by a coil spring and the lower end set up on the free end of the arm 21b extending from the wheel carrier 21. Alternatively, the coil spring 33, or the damper 32 provided with the coil spring 33, may be set up on the lower arm 23. In this case, the suspension apparatus 20 can be lowered, and accordingly, the length of the projection of the damper 32 projecting toward the vehicle body can be reduced.

In the above embodiments, furthermore, the mounting position at which the trailing arm 24 is mounted to the wheel carrier 21 is located between the mounting position of the upper arm 22 and the axle housing 21a. The trailing arm 24 may alternatively be coupled to the wheel carrier 21 at a location lower than the axle housing 21a.

Figure 13:
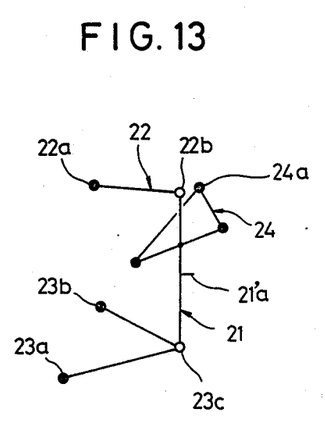
FIGS. 13 and 14 are diagrams showing simplified illustrations of apparatuses according to still other embodiments of the invention.

The swing arm is not limited to the above-described trailing arm 24, the connection end 24a of which is located frontward of the vehicle body relative to the wheel carrier 21; alternatively, as shown in FIG. 13, a swing arm comprising an inverted A-shaped leading arm having a connection end 24a located rearward of the vehicle body relative to the wheel carrier 21 may be used.

Figure 14:
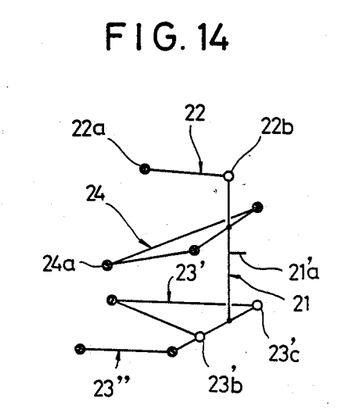

Further, the lower arm assembly may, as distinct from that of the above-described embodiment, comprise an arm 23' of an inverted-A shape as viewed in the widthwise direction of the vehicle body, and a lateral arm 23" located frontward or rearward of the inverted A-shaped arm 23', extending in the widthwise direction of the vehicle body, and pivotably coupled at one end to the lower portion of the wheel carrier and at the other end to the vehicle body, as shown in FIG. 14.

Furthermore, the suspension apparatus of FIG. 9 may further include an I-shaped link 50 extending frontward and inward of the vehicle body from the lower portion of the wheel carrier 21" and coupled to the vehicle body.

What is claimed is:

1. A rear suspension apparatus for connection between a rear wheel and a vehicle body of a motor vehicle, comprising:
    a wheel carrier rotatably supporting the rear wheel and having an upper portion and a lower portion;
    an upper arm extending inward from said wheel carrier in a widthwise direction of the vehicle body, and having an outer end pivotably connected to the upper portion of said wheel carrier and an inner end pivotably connected to the vehicle body;
    a lower arm assembly extending inwardly of the vehicle body from said wheel carrier, and having a plurality of inner ends pivotably connected to the vehicle body and at least one outer end pivotably connected to the lower portion of said wheel carrier and cooperating with the outer end of said upper arm to define a center line of a virtual kingpin; and
    a swing arm extending from said wheel carrier inwardly of the vehicle body and obliquely at a predetermined angle to a longitudinal direction of the vehicle body, said swing arm having two outer ends located between the outer end of said upper arm and the outer end of said lower arm assembly and pivotably connected to said wheel carrier by two pivots set apart from each other in the longitudinal direction of the vehicle body, and an inner end pivotably connected to the vehicle body.

2. The rear suspension apparatus according to claim 1, wherein said swing arm comprises a trailing arm having outer ends thereof located rearward of the vehicle body relative to an inner end thereof, said outer ends of said trailing arm being located between an axle of the rear wheel and the outer end of said upper arm and individually pivotably connected to said wheel carrier.

3. The rear suspension apparatus according to claim 1, which further comprises means for pivotably connecting the outer ends of the swing arm to said wheel carrier, said means including elastic bushings arranged in the outer ends of said swing arm and having an axis thereof directed along the longitudinal direction of the vehicle body.

4. The rear suspension apparatus according to claim 1, wherein one of the two outer ends of said swing arm is located frontward of the vehicle body relative to the axis of the rear wheel, and the other of the two outer ends is located rearward of the vehicle body relative to the axis of the rear wheel.

5. The rear suspension apparatus according to claim 1, wherein said swing arm comprises a trailing arm having outer ends thereof located rearward of the vehicle body relative to an inner end thereof, and said apparatus further comprises means for pivotably connecting the inner end of said trailing arm to the vehicle body, said means including an elastic bushing arranged in the inner end of said trailing arm, said elastic bushing having an axis thereof inclined at a predetermined angle to a line perpendicular to a line passing the center of the rear wheel and the axial center of the elastic bushing, as viewed in plane from above the vehicle body.

6. The rear suspension apparatus according to claim 1, wherein said swing arm comprises a trailing arm having outer ends thereof located rearward of the vehicle body relative to an inner end thereof, and said lower arm assembly has two inner ends set apart from each other in the longitudinal direction of the vehicle body, one of the two inner ends of said lower arm assembly being located near the inner end of said swing arm, and the other of the two inner ends being located near the inner end of said upper arm.

7. The rear suspension apparatus according to claim 1, wherein said lower arm assembly includes an A-shaped lower arm having two inner ends and one outer end.

8. The rear suspension apparatus according to claim 1, wherein said swing arm comprises a trailing arm having outer ends thereof located rearward of the vehicle body relative to an inner end thereof, and said lower arm assembly has two inner ends, a line passing the two inner ends of said lower arm assembly being inclined upward toward the front of the vehicle body as viewed from a side of the vehicle body.

9. The rear suspension apparatus according to claim 1, wherein said lower arm assembly includes a lateral arm having an outer end and an inner end, and a tension rod connecting said lateral arm to the vehicle body and located frontward of the vehicle body relative to said lateral arm.

10. The rear suspension apparatus according to claim 1, wherein said lower arm assembly includes a lateral arm having an outer end and an inner end, and a compression rod connecting said lateral arm to the vehicle body and located rearward of the vehicle body relative to said lateral arm.

11. The rear suspension apparatus according to claim 1, wherein said lower arm assembly includes two lateral arms arranged at a distance from each other in the longitudinal direction of the vehicle body and each having an outer end and an inner end, said lateral arms extending in the widthwise direction of the vehicle body.

12. The rear suspension apparatus according to claim 11, wherein said lower arm assembly further includes a link connecting said wheel carrier to the vehicle body and extending from said wheel carrier in the longitudinal direction of the vehicle body.

13. The rear suspension apparatus according to claim 1, wherein said lower arm assembly includes an inverted A-shaped arm having two outer ends and one inner end, and a lateral arm located frontward or rearward of said inverted A-shaped arm with respect to the longitudinal direction of the vehicle body, said lateral arm extending in the widthwise direction of the vehicle body.

14. The rear suspension apparatus according to claim 1, wherein said swing arm comprises a leading arm having outer ends thereof located frontward of the vehicle body relative to an inner end thereof.

* * * * *